No. 642,877. Patented Feb. 6, 1900.
O. H. PECK & C. L. ANDERSON.
CAMERA.
(Application filed June 9, 1898. Renewed Sept. 18, 1899.)
(No Model.) 2 Sheets—Sheet 1.

Witnesses
C. F. Kilgor
J. D. Merchant

Inventors
Orlando H. Peck
Charles L. Anderson
By their Attorney
Jas. F. Williamson

THE NORRIS PETERS CO., PHOTO-LITHO., WASHINGTON, D. C.

No. 642,877. Patented Feb. 6, 1900.
O. H. PECK & C. L. ANDERSON.
CAMERA.
(Application filed June 9, 1898. Renewed Sept. 18, 1899.)
(No Model.) 2 Sheets—Sheet 2.
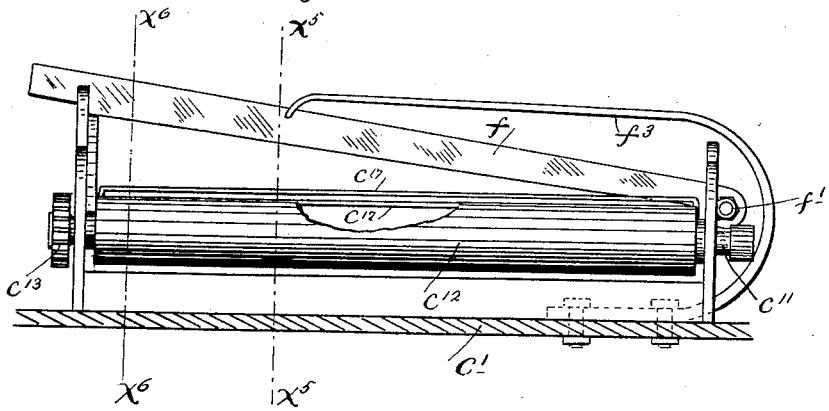
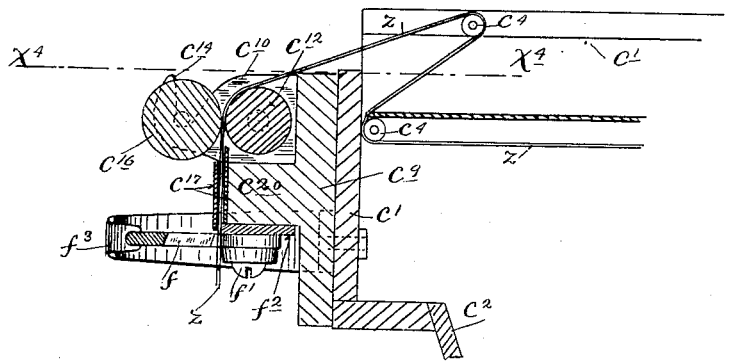
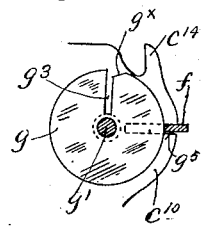
Witnesses
Inventors
Orlando H. Peck
Charles L. Anderson
By their Attorney

UNITED STATES PATENT OFFICE.

ORLANDO H. PECK AND CHARLES L. ANDERSON, OF MINNEAPOLIS, MINNESOTA; SAID ANDERSON ASSIGNOR TO SAID PECK.

CAMERA.

SPECIFICATION forming part of Letters Patent No. 642,877, dated February 6, 1900.

Application filed June 9, 1898. Renewed September 18, 1899. Serial No. 730,950. (No model.)

*To all whom it may concern:*

Be it known that we, ORLANDO H. PECK and CHARLES L. ANDERSON, citizens of the United States, residing at Minneapolis, in the county of Hennepin and State of Minnesota, have invented certain new and useful Improvements in Cameras; and we do hereby declare the following to be a full, clear, and description of the invention, such as will enable others skilled in the art to which it appertains to make and use the same.

Our invention relates to cameras, and has for its object to improve the same in the several points hereinafter noted.

To these ends the invention consists of the novel devices and combinations of devices hereinafter described, and defined in the claims.

Our invention is illustrated in the accompanying drawings, wherein like characters indicate like parts throughout the several views.

Figure 1:
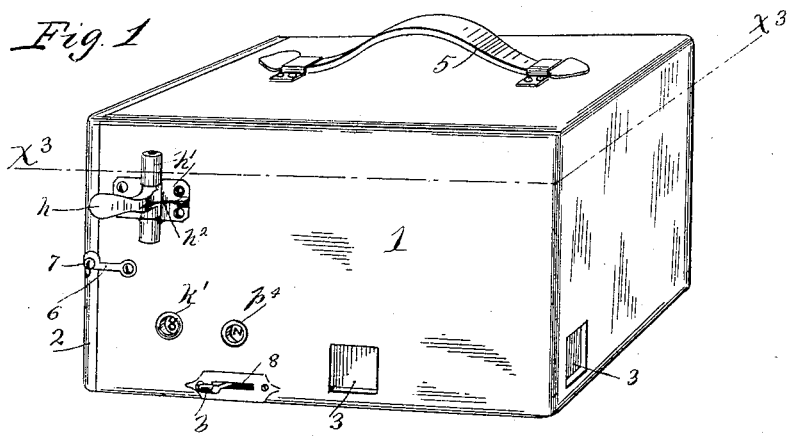
Figure 2:
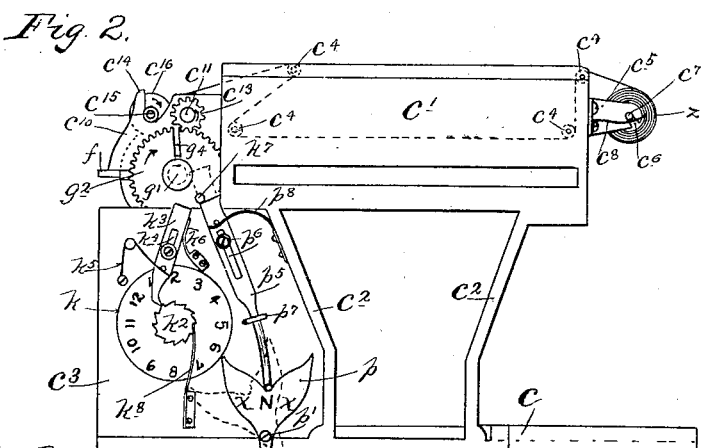
Figure 3:
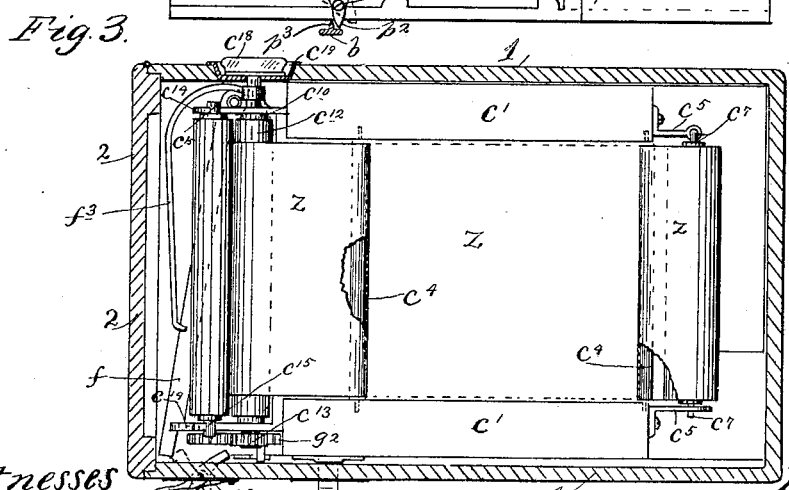

Figure 1 is a perspective view of a camera. Fig. 2 is a side elevation of the interior mechanism of the camera removed from the case. Fig. 3 is a horizontal section taken approximately on the line $x^3\ x^3$ of Fig. 1. Fig. 4 is a plan view, on an enlarged scale, showing the film cutter or knife and associated parts, some parts being sectioned on the line $x^4\ x^4$ of Fig. 5. Fig. 5 is a transverse section taken on the line $x^5\ x^5$ of Fig. 4; and Fig. 6 is a detail view, the parts shown being sectioned on the line $x^6\ x^6$ of Fig. 4.

1 indicates the box or case of the camera, which, as is ordinary, is provided with the hinged end 2, finders 3, and lens-opening, (not shown,) in line with which latter the lens is of course located. Furthermore, as shown, the box or case 1 is provided with a handle 5, and the hinged end 2 is adapted to be secured in its closed position by a pivoted hook 6 on said box engaging with the pin 7 on said hinged end.

In connection with suitable film-feeding mechanism we employ a film cutter or knife of novel construction, the preferred form of which will be described immediately after describing the said film-feeding mechanism. This film-feeding mechanism is mounted on and removable with a supporting bracket or frame which fits within and is removable from the box or case 1. The bracket, as shown and preferred, is made up principally of a flat bed-section $c$, a flanged head $c'$, transverse connecting-flanges $c^2$, and a vertically and longitudinally extended side flange $c^3$. Loose guide-rollers $c^4$ are mounted in the flanges of the head $c'$, and a pair of bearing-brackets $c^5$, with open-end slots $c^6$, are rigidly secured to the innermost ends of the flanges of said head $c'$. A spindle $c^7$ is removably held in place in the slot $c^6$ by light springs $c^7$, secured to said brackets $c^5$. The roll of unexposed film $z$ is placed on the spindles $c^8$ and passed over the guide-rollers $c^4$, as indicated in Fig. 2.

To the outermost end of the head $c'$ a bearing-block $c^9$ is rigidly secured, and in end flanges $c^{10}$ thereof the trunnions $c^{11}$ of the feed-roller $c^{12}$ are loosely mounted. One trunnion $c^{11}$ is provided with a small spur-pinion $c^{13}$. The outer ends of the end flanges $c^{10}$ are provided with hook-like bearing-seats $c^{14}$, in which the trunnions $c^{15}$ of a presser-roller $c^{16}$ are journaled. The presser-roller $c^{16}$ is preferably slightly elastic, and when forced into its seat by downward pressure it presses against the feed-roller $c^{12}$.

The film $z$ after passing over the guide-rollers $c^4$ is passed between the feed-rollers $c^{12}$ and presser-roller $c^{16}$. It is then passed downward between vertical and transversely-extended guide-flanges $c^{17}$, immediately below which the cutter or knife operates thereon, as presently described. The feed-roller $c^{12}$ may be given its feed movement at will by means of a key or finger-piece $c^{18}$, which, as shown, works through a countersunk thimble $c^{19}$ in one side of the box and is detachably securable to the trunnion $c^{11}$, which projects away from the pinion $c^{13}$. This key or finger-piece $c^{18}$ must, of course, be applied to the trunnions $c^{11}$ after the removable mechanism is placed within the box or case and must be removed before the said mechanism can be removed.

In the film-cutter we employ a knife or shear blade $f$, which is pivoted at $f'$ on a stud or screw that is screwed into or projects from a horizontally-extended flange or rib $c^{20}$ of the bearing-block $c^9$. This knife or blade $f$ preferably coöperates with a fixed shear-blade $f^2$, that is directly secured to the under surface of the rib $c^{20}$, just below the guide-flanges $c^{17}$. The knife $f$ is under spring tension to close or move inward from a leaf-spring $f^3$, one end of which is rigidly secured to the head $c'$ and the other end of which is notched so as to embrace the back edge of said knife. The spring $f^3$ has also a side action on the knife, which causes the same to press tightly against the coöperating edge of the fixed shear-blade $f^2$. The knife or blade $f$ is tripped into action or released, so that under the action of its spring $f^3$ it will cut the film-section by means of an actuating device operated by the strip-feeding mechanism and by us termed the "knife-trip." This device consists of a cam or disk $g$, which, as shown, is rigidly secured on a short common shaft $g'$, with a spur-gear $g^2$, which is in mesh with the spur-pinion $c^{13}$ on the trunnion of the feed-roller $f^{12}$. The shaft $g^{11}$ is journaled in one of the end flanges $c^{10}$ of the bearing-block $c^9$, and the said parts $g$ and $g^2$ work one on each side of said flange. The cam or disk $g$ has a radial slot $g^3$, which stands in line with a similar slot $g^4$ in the spur-wheel $g^2$, and the said flange $c^{10}$ has a slot $g^5$, with which the said slots $g^3$ and $g^4$ may be registered. The free end of the knife or blade $f$ projects through and works in the slot $g^5$ and is adapted to be thrown into the slots $g^3$ and $g^4$ when said slots are in line therewith, as is necessary to permit the cutting movement thereof.

After a section of the film has been cut off the knife or blade $f$ remains in the slots $g^3$ and $g^4$, and thereby locks both the trip device and the film-feeding mechanism against movement for the time being.

The free end of the knife $f$ is adapted to be engaged by the inner end of a finger-lever $h$, that works with a close joint through a slotted bearing $h'$, to which it is pivoted. A spring $h^2$ normally holds said lever $h$ in the position indicated by full lines in Fig. 3. When the lever $h$ is forced into the position indicated by dotted lines in Fig. 3, it will move the free end of the knife into line with the cam-surface $g^×$ of disk $g$ and will itself be held by the said knife. The knife $f$ and lever $h$ will remain in this position until the strip-feeding mechanism is moved by means of the key $c^{18}$ and feed-roller $c^{12}$. By the initial strip-feeding movement the cam-surface $g^×$ will engage the free end of the knife, cam the same outward onto the periphery of the disk $g$, and thus release the lever $h$. The knife being thus retracted will be held from action until one complete rotation of the disk or cam $g$ has been made, at the completion of which rotation the knife will again enter the slots $g^3$ and $g^4$ and positively lock the strip-feeding mechanism from further movement.

It should be here observed that in the construction shown the spur-gear $g^2$ is three times the diameter of the pinion $c^{11}$, and that the feed-roller $c^{12}$ is of such diameter that three rotations thereof or one rotation of disk $g$ will feed the film a distance equal to the length of the desired section of film which is to be cut off. It consequently follows that when the knife has been retracted it is only necessary to continue the movement of the strip-feeding mechanism until the movement thereof is temporarily but positively interrupted by the entrance of the knife into the slots $g^3$ $g^4$. This action is positive and accurate and removes all possibility of incorrectly cutting the film. The film-sections which are cut off will usually curl up into small rolls, and they will be dropped into the compartment formed between the hinged end 2 of the camera-box and the adjacent connecting-flange $c^2$. These exposed and cut sections may of course may be removed from the camera and developed at any time, regardless of the number of sections which have been exposed, and it is of course for this purpose that a cutting device is provided. Attention is also called to the fact that the film is passed over its guide-rollers in such manner that the distance between the knife and the nearest portion of the section of the film which is in position for exposure is equal to the length of section of film which is to be exposed. It should also be noted that the trunnions $c^{15}$ of the presser-roller $c^{16}$ are continually crowded or worked downward to the bottoms of their seats $c^{14}$ by the rotary movement of said presser-roller. The connecting webs or flanges $c^2$ are so spaced apart that they will not cut off the rays of light which should pass from the lens (not shown) to the exposed film-section.

It is usually very desirable to know the number of exposures made or number of sections cut, and to this end we provide a register or tally which is actuated either directly or indirectly from the film-feeding mechanism. This register or tally comprises a dial or graduated numeral-disk $k$, the numerals of which are adapted to be brought successively into registration with a sight-opening $k'$ in one side of the box or case 1. On one face the disk $k$ is provided with a ratchet-wheel or hub $k^2$, upon which the pawl end of a sliding plunger $k^3$ operates. This pawl-plunger $k^3$ is secured to the flange $c^3$ by a slot-and-pin connection $k^4$, and it is normally held upward by a spring $k^5$. A small leaf-spring $k^6$ guides the upper end of said pawl $k^3$ and permits the same a slight pivotal movement under the action of the ratchet-wheel $k^2$. A pin or projection $k^7$ on the gear $g^2$ engages the upper end of the pawl $k^3$ once at each complete rotation of said gear, and by forcing said pawl downward moves the numeral disk or dial one step in advance, and thus keeps track of and registers the number of the film-sections exposed and cut. A retaining pawl or spring $k^8$ prevents return movement of the dial.

It is of course the proper manipulation to move the film immediately after an exposure is made, so as to always have an unexposed section of film in position and ready for the next exposure, and this is the practice universally adopted. However, as a matter of fact, it very often happens that the operator's attention is diverted immediately following making an exposure, so that he becomes uncertain as to whether or not the proper movement of the film has been made. He will seldom remember the number of exposures previously made, and hence, even if a register or tally is provided, he is very liable to be unable to determine whether or not the movement has been made. We remove the possibility of any such an uncertainty by the provision of a device which is operated directly or indirectly from the strip-feeding mechanism and which will indicate at a glance whether or not the film has been moved since the last exposure. In its preferred form this device (herein designated as the "indicator" to distinguish it from the register or tally heretofore described) is comprised as follows: $p$ indicates a Y-shaped pendulum which is pivoted to the base $c$ at $p'$ and is provided with a pointed stem $p^2$, which is adapted to be struck by a projection $p^3$ on the toggle-lever section $b$ at each movement in either direction of the shutter. At its intermediate portion the pendulum $p$ is marked with a character, such as "N," indicating "not exposed," and on each side it is marked with characters—such as "X," for example—indicating "exposed." Any one of these characters, but only one at a time, is adapted to be brought into registration with a sight-hole $p^4$ in the side of the case or box 1. $p^5$ indicates a sliding plunger, which has a slot-and-pin connection $p^6$ with a flange $c^3$ of the main bracket and works through a keeper $p^7$ thereon. This plunger $p^5$ is normally held upward, as indicated by dotted lines in Fig. 2, by means of a spring $p^8$; but its upper end is adapted to be engaged once at each complete rotation of the gear $g^2$ and forced downward by the pin $k^7$, heretofore noted as operating upon the pawl $k^3$. This action is illustrated by full lines in Fig. 2, by reference to which it will be seen that the lower end of said plunger $p^5$ engages the prongs of the pendulum $p$ and by its action thereon forces the same into its intermediate position, in which position "not exposed" will be indicated through the sight-opening $p^4$. When the pin $k^7$ passes the upper end of the plunger $p^5$, said plunger will be thrown upward by the action of its spring $p^8$, but will leave the indicator-pendulum $p$ standing where set. The pendulum will remain in this position until the shutter is moved and an exposure made, which action will cause the projection $p^3$ of the shutter-operating lever $b$, which works through a slot 8, to strike the point $p^2$ and throw said pendulum into either one or the other of its positions, indicating "exposed." The indicator-pendulum can only be moved from such a position by a movement of the film sufficient to bring an unexposed section into place.

What we claim, and desire to secure by Letters Patent of the United States, is as follows:

1. The combination with feeding mechanism, of a cutter under spring tension to act and cut off the film, and a trip normally holding said cutter retracted and inactive against the strain of its spring device, which trip is arranged itself to be actuated by said feeding mechanism, and when actuated to release said cutter and permit the same to cut the film under the action of its spring device, substantially as described.

2. In a camera, the combination with a pair of rollers, between which the film is passed, of a knife or blade under spring tension to cut off said film, a notched or slotted disk for holding said knife inactive and releasing the same, and connections for operating said disk from one of said rollers, substantially as described.

3. In a camera, the combination with film-feeding mechanism, of a knife or film-cutter under spring tension to act, a finger-piece for setting said cutter in an inoperative position, and a trip operated by said feeding mechanism for releasing said cutter, when the proper section of film has been fed, substantially as described.

4. In a camera, the combination with the film-feeding mechanism, the shutter and its actuating device, of the indicator-pendulum $p\ p^2$, a projection from the shutter-actuating device engageable with said part $p^2$, the longitudinally-movable restoring-plunger $p^5$ operating on said pendulum, and a rotary part $g^2$ provided with the projection $k^7$ operating on said plunger, substantially as described.

5. In a camera, the combination with film-feeding mechanism, of a knife or cutter under spring tension to act, and a trip for holding said cutter inoperative, itself actuated from said feeding mechanism and operating to lock the said feeding mechanism at intervals of movement which give the desired length to the film-sections, substantially as described.

6. In a camera, the combination with film-feeding mechanism, of a knife under spring tension to act, a finger-operated knife-setting device for setting said knife in position for action, and a trip actuated from said feed mechanism, and itself operating, first to release said setting device and retain said knife and later release said knife, substantially as described.

7. In a camera, the combination with film-feeding mechanism, of a film-cutter, and means actuated by said film-feeding mechanism at intervals of movement which give the desired length of film-section, which means operates primarily to lock said feeding mechanism, and, secondarily, to render said cutter operative, substantially as described.

8. In a camera, the combination with film-feeding mechanism, of a cutter under spring tension to act, a rotary and radially slotted part driven from said feeding mechanism and normally holding said knife inoperative, the arrangement being such that when said radial slot is brought into alinement with said cutter the said feeding mechanism will be locked and said knife released, substantially as and for the purposes set forth.

In testimony whereof we affix our signatures in presence of two witnesses.

ORLANDO H. PECK.
CHARLES L. ANDERSON.

Witnesses:
H. C. SIEVERS,
R. G. MCFARLANE.